Patented Jan. 29, 1952

2,583,588

UNITED STATES PATENT OFFICE 2,583,588

LESS INFLAMMABLE HYDRAULIC FLUID

James Calvin Mosteller, Fairfield, Ohio

No Drawing. Application June 8, 1949,
Serial No. 97,931

1 Claim. (Cl. 252—78)

(Granted under the act of March 3, 1883, as
amended April 30, 1928; 370 O. G. 757)

The invention described herein may be manufactured and used by or for the United States Government for governmental purposes without payment to me of any royalty thereon.

This invention relates to a hydraulic fluid, specifically an oil base mixture, which is suitable for general use. It is intended however especially for use in airplane hydraulic systems, and for such use it is intended to meet the severe requirements of Air Force-Navy specification AN–O–366 entitled Hydraulic Fluid, Petroleum Base.

One object of the invention is to provide an oil which is substantially fireproof as measured by the tests of Air Force-Navy specification 3150 in regard to flammability.

Another object is to provide a fluid which will function both at —67° F. and at 250° F. or higher.

Another object is to provide a fluid which will have a good viscosity, i. e. that the fluid will be neither too thick nor too thin at the above extremes of temperature to act as a good lubricant on mechanical parts with which it designedly comes into contact.

Another object is to provide a formulation of ingredients according to which a perfect solution is obtained so that no precipitation or other separation of ingredients occurs even at the named temperature extremes.

Another object is to provide a formulation which is nontoxic and not nauseating or irritating.

Another object is to provide a fluid which will not have any undue swelling action on the various kinds of synthetic rubber used in aircraft hydraulic systems.

Another object is to provide a fluid of the above characteristics in which a viscosity-improver of especially desirable characteristics, i. e. polymerized di-octyl methyl methacrylate, hereinafter referred to as "Acryloid," is incorporated.

The addition of a lower-boiling fluorine-containing organic compound, which is a feature of my invention, to the mineral-base stock used in specification AN–O–336 lowers the viscosity-temperature characteristics of the resulting mineral oil mixture. The mixture is thereby made unsatisfactory for aircraft use because it is of too low a viscosity at high operating temperatures.

This dilemma cannot be solved by leaving out the lower-boiling fluorine-containing organic compound if high fire resistance is to be a property of the resulting fluid. Fluorine-containing compounds, especially the lower boiling organic compounds have valuable properties as "snuffers" of combustion. This class of compounds comprises liquids which are non-flammable of themselves and when contained in an aircraft hydraulic fluid and exposed to a heated surface or fire will vaporize sooner than the mineral oil component. Due to the high density of the fluorine containing compound, its vapors will cover the heated surface or fire sufficiently to prevent enough oxygen coming in contact with the base oil to cause ignition of the oil, and in many cases will extinguish a fire whch is already in progress.

I am aware of United States Patent 2,449,631 to Zimmer et al., which aims to produce a hydraulic oil of somewhat similar characteristics. Oil which is the subject of that patent contains a polymer of tri-fluoro-ethylene, which is one of the present inventor's ingredients. The present invention is however an improvement on the Zimmer et al. invention, because it is impossible for Zimmer et al. to incorporate the highly desirable "Acryloid" in their composition due to the lack of a master solvent. As an example of my invention, I shall describe the preparation of a less inflammable hydraulic fluid by the use of the following formulation:

25 to 35% by weight, tetra-chloro-tetra-fluoro-propane or equivalent
15 to 25% by weight, mono-chloro-tri-fluoro-ethylene polymer ("Fluorolube FS")
35 to 45% by weight, "Voltesso" 36 (Cetane)
7 to 13% by weight, "Acryloid" HF–855
6 to 10% by weight, "XCT" White Oil
0.4% by weight, 2–6 di-tertiary-butyl, 4-methyl phenol The "Voltesso 36" is a product of the Standard Oil Company of New Jersey and is a fraction of petroleum of paraffin and naphthenic constituents which has undergone dewaxing and de-aromatization to give a product having a viscosity of 2.4 centistokes at 210 degrees Fahrenheit, 9.6 centistokes at 100 degrees Fahrenheit and 254 centistokes at —40 degrees Fahrenheit, having an approximate A. S. T. M. anilin point of 190 degrees Fahrenheit, a flash point of about 310 degrees Fahrenheit, and similar in molecular weight, volatility and viscosity to cetane.

The Acryloid HF-855 is manufactured by the Rohm and Haas Company and is supplied as a solution of 55.9% by weight of active "Acryloid" in XCT White Oil.

The 2-6 di-tertiarybutyl, 4-methyl phenol is a corrosion-and-oxidation inhibitor when used in small percentages.

All components listed in the formulation are blended together with stirring and heating with the exception of the 2-6 di-tertiarybutyl-4-methyl phenol which is added after the complete mixture is obtained; the amount added being 0.4% calculated on the weight of the complete mixture.

The function of the mono-chloro-tri-fluoro-ethylene polymer ("Fluorolube FS") is that of a thickener of a non-flammability-conferring agent. It also imparts properties and assists in conferring lubricating and shear-breakdown-resisting properties and a high boiling point.

The function of the tetra-chloro-tetra-fluoro-propane or equivalent is both that of a master solvent and of a fire proofing agent. Its boiling point is materially less than that of the mono-chloro-tri-fluoro-ethylene polymer. As regards the latter, it is to be noted that there are over 100 degrees of polymerization possible. I use the polymer fraction having a boiling point range between the temperatures 70° C. and 100° C. at 1 mm. pressure and a specific gravity of 1.94 at 25° C. Unless this particular fraction is employed, most of the useful effect of the ingredient will be lost and the fluid will not have the properties that I seek. Zimmer et al. do not mention which polymers they employ.

The boiling point governs the degree of viscosity improvement to be expected, i. e. the higher the boiling point, the greater the viscosity improvement and the less the fire-extinguishing quality.

The specific lower-boiling fluorine-containing organic compound that I have mentioned has numerous equivalents. The equivalents may be as I have ascertained by experiment, either cyclic or straight chain compounds. One characteristic of the satisfactory cyclic compounds is that they all have at least one tri-fluoro-methyl substituent attached directly to the benzene ring and that they also contain at least chlorine atom similarly attached. The reason for the requirement of chlorine-fluorine groups is:

a. To extend the liquid range.

b. To obtain a solubility with hydrocarbons, also with "Fluorolube F. S." and "Acryloid H. F. 855."

The satisfactory cyclic compounds may have two tri-fluoro-methyl groups attached to the benzene ring and at least two chlorine atoms also directly attached to the ring.

c. A tri-fluoro-methyl group may also be attached to the ring also an ethyl or propyl or butyl group attached to the ring and containing halogen atoms replacing all of the hydrogens. If chlorine is the halogen used, then fluorine (CF$_2$ or CF$_3$ groups) must be present to enhance stability of the chlorine-containing group. It is desirable to leave at least one chlorine atom attached to the group, also at least one chlorine atom attached to the benzene ring for solubility-increase purposes.

d. A tri-fluoro-methyl group attached to the ring; also an ethyl propyl or butyl group being perfluoro attached to ring. Also, a butoxy group containing no fluorine is required to be attached to the ring to enhance solubility.

Of the straight chain compounds, the suitable members are paraffins containing:

a. At least one-half of the hydrogens replaced by fluorine and the remaining ones replaced by chlorine.

b. At least one-half of the hydrogens replaced by chlorine and CF$_2$ groups adjacent to carbon-chlorine groups to enhance the stability of the chlorine to hydrolysis.

c. At least one-half of the hydrogens replaced by a halogen of which at least three are fluorine atoms and at least two are chlorine atoms per molecule.

Specifically, the lower boiling fluorine containing chloro-hydro-carbons which I may use as combination fire proofing agents and master solvents are by name:

Tetrachlorotetrafluoropropane

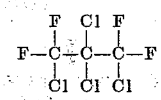

Chloro 1-3 bis (trifluoromethyl) benzene

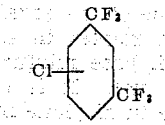

Dichloro (trifluoromethyl) benzene

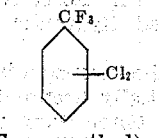

Dichlorobis (trifluoromethyl) benzene

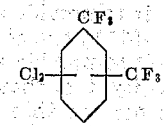

Chloro - 1(trifluoromethyl) - 4 - (chlorotetrafluoroethyl) benzene

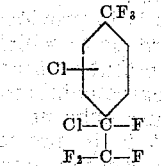

Butoxy - 1 - (pentafluoroethyl) - 4 - (trifluoromethyl) benzene

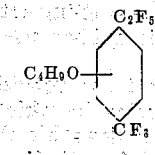

The formulae given are suggestive only because the exact constitution of many of the derivatives is still unknown. This uncertainty is indicated by showing the bond from the substituent of a benzene ring entering the side of the ring instead of attaching to a corner as is conventional.

It is to be understood that in the following claim the term "an equivalent of tetra-chloro-tetra-fluoro-propane" is intended to include tetra-chloro-tetra-fluoro propane itself.

What I claim is:

A homogeneous composition of matter suitable for use as a hydraulic fluid, comprising:

| | By weight |
|---|---|
| A polymer of mono-chloro-tri-fluoro-ethylene having a specific gravity of 1.94 at 25° C | 15% to 25% |
| A petroleum fraction of paraffinic and naphthenic constituents similar to cetane in molecular weight, volatility and viscosity | 35% to 45% |
| A liquid di-octyl methyl methacrylate polymer soluble in white lubricating oil | 7% to 13% |
| A white lubricating oil | 6% to 10% |
| 2-6-di-tertiarybutyl, 4-methyl phenol, about 0.4% tetra-chloro-tetra-fluoro-propane | 25% to 35% |

JAMES CALVIN MOSTELLER.

REFERENCES CITED

The following references are of record in the file of this patent:

UNITED STATES PATENTS

| Number | Name | Date |
|---|---|---|
| 2,091,627 | Bruson | Aug. 31, 1937 |
| 2,230,654 | Plunkett | Feb. 4, 1941 |
| 2,318,684 | Gaylor | May 11, 1943 |
| 2,438,446 | Leland | Mar. 23, 1948 |
| 2,449,631 | Zimmer et al. | Sept. 21, 1948 |